(12) United States Patent
Li

(10) Patent No.: US 8,132,112 B2
(45) Date of Patent: Mar. 6, 2012

(54) LIVE SEARCH CHAT ROOM

(75) Inventor: Xin Li, Shanghai (CN)

(73) Assignee: eBay Inc., San Jose, CA (US)

( * ) Notice: Subject to any disclaimer, the term of this patent is extended or adjusted under 35 U.S.C. 154(b) by 987 days.

(21) Appl. No.: 12/088,125

(22) PCT Filed: Dec. 3, 2007

(86) PCT No.: PCT/CN2007/003419
§ 371 (c)(1),
(2), (4) Date: Mar. 26, 2008

(87) PCT Pub. No.: WO2009/070927
PCT Pub. Date: Jun. 11, 2009

(65) Prior Publication Data
US 2010/0180217 A1    Jul. 15, 2010

(51) Int. Cl.
*G06F 3/00*      (2006.01)
*G06F 15/16*     (2006.01)

(52) U.S. Cl. ........ 715/758; 715/751; 715/753; 709/204; 709/205; 709/206

(58) Field of Classification Search .................. 715/751, 715/753, 758; 709/204, 205, 206, 207
See application file for complete search history.

(56) References Cited

U.S. PATENT DOCUMENTS

| | | | | |
|---|---|---|---|---|
| 5,793,365 A | * | 8/1998 | Tang et al. | 715/758 |
| 6,154,782 A | * | 11/2000 | Kawaguchi et al. | 709/239 |
| 6,400,381 B1 | * | 6/2002 | Barrett et al. | 715/758 |
| 6,636,853 B1 | * | 10/2003 | Stephens, Jr. | 1/1 |
| 6,651,086 B1 | * | 11/2003 | Manber et al. | 709/205 |
| 6,745,178 B1 | * | 6/2004 | Emens et al. | 707/741 |
| 7,440,976 B2 | * | 10/2008 | Hart et al. | 1/1 |
| 2003/0225833 A1 | * | 12/2003 | Pilat et al. | 709/204 |
| 2004/0122895 A1 | * | 6/2004 | Gourraud | 709/204 |
| 2007/0244968 A1 | * | 10/2007 | Andreasson | 709/204 |
| 2008/0034040 A1 | * | 2/2008 | Wherry et al. | 709/204 |
| 2009/0063990 A1 | * | 3/2009 | Morris et al. | 715/751 |

FOREIGN PATENT DOCUMENTS

| | | |
|---|---|---|
| CN | 101072205 A | 11/2007 |
| GB | 2352856 | 2/2001 |
| WO | WO-0126018 A2 | 4/2001 |
| WO | WO-2009070927 A1 | 6/2009 |

OTHER PUBLICATIONS

Frequently Asked Questions: Chat, Mar. 6, 2001, wayback machine http://www.ec-online.net/about/chatfaqs.htm.*

(Continued)

*Primary Examiner* — Tadeese Hailu
*Assistant Examiner* — Nicholas Ulrich
(74) *Attorney, Agent, or Firm* — Schwegman, Lundberg & Woessner, P.A.

(57) ABSTRACT

One embodiment provides a system of exchanging information between a first party and a second party over a network. The system includes an interface module to prompt a query from a first party by a first key word search and to prompt a query from a second party by a second key word search in the network, a key word comparator module to compare the first and second key word searches, and a chat room admission module to automatically admit the first and second parties to a chat room if the first and second key word searches have substantial similarity. The chat room is embedded into a search result web page.

17 Claims, 5 Drawing Sheets

OTHER PUBLICATIONS

"International Application Serial No. PCT/CN2007/003419, International Search Report mailed Sep. 11, 2008", 3 pgs.

"International Application Serial No. PCT/CN2007/003419, Written Opinion mailed Sep. 11, 2008", 5 pgs.

* cited by examiner

LIVE SEARCH CHAT ROOM

RELATED APPLICATION

This application is a U.S. National Stage Filing under 35 U.S.C. 371 from International Patent Application Serial No. PCT/CN2007/003419, filed Dec. 3, 2007, the content of which is incorporated herein by reference in their entirety.

TECHNICAL FIELD

The present application relates generally to a system and method of exchanging information over a network.

BACKGROUND

With the development of computer and network related technologies, many users choose to purchase or sell products (e.g., goods or services) over a network. For example, by the use of a client-sever system, users may conduct a search over the network. Typically, during the e-commerce process, only the server knows who is searching for what. However, sellers may not know the potential buyers who are searching for their products, and buyers with same interests may not have an easy way to exchange ideas on their searches. On the other hand, the search activities are typically individual based, and thus do not have the liveness and excitement of real world shopping. For example, buyers of the same interests may not put their heads together on a hot shopping area.

BRIEF DESCRIPTION OF THE DRAWINGS

The present application is illustrated by way of example and not limitation in the figures of the accompanying drawings, in which like references indicate similar elements and in which.

DETAILED DESCRIPTION

In the following detailed description of the embodiments, reference is made to the accompanying drawings, which form a part hereof, and in which is shown by way of illustration specific embodiments in which the application may be practiced.

The term "client-server" denotes a model of interaction in a distributed computer system in which a program at one site sends a request to a program at another site and waits for a response. The requesting program is called the "client," and the program that responds to the request is called the "server."

One example embodiment is described in the context of a commerce system, however it will be appreciated that the invention could be implemented in other contexts. Indeed, other example embodiments may be implemented in a wide variety of networking environments in which a data file (or other data structure) requires communication or transmission over a network.

Figure 1:
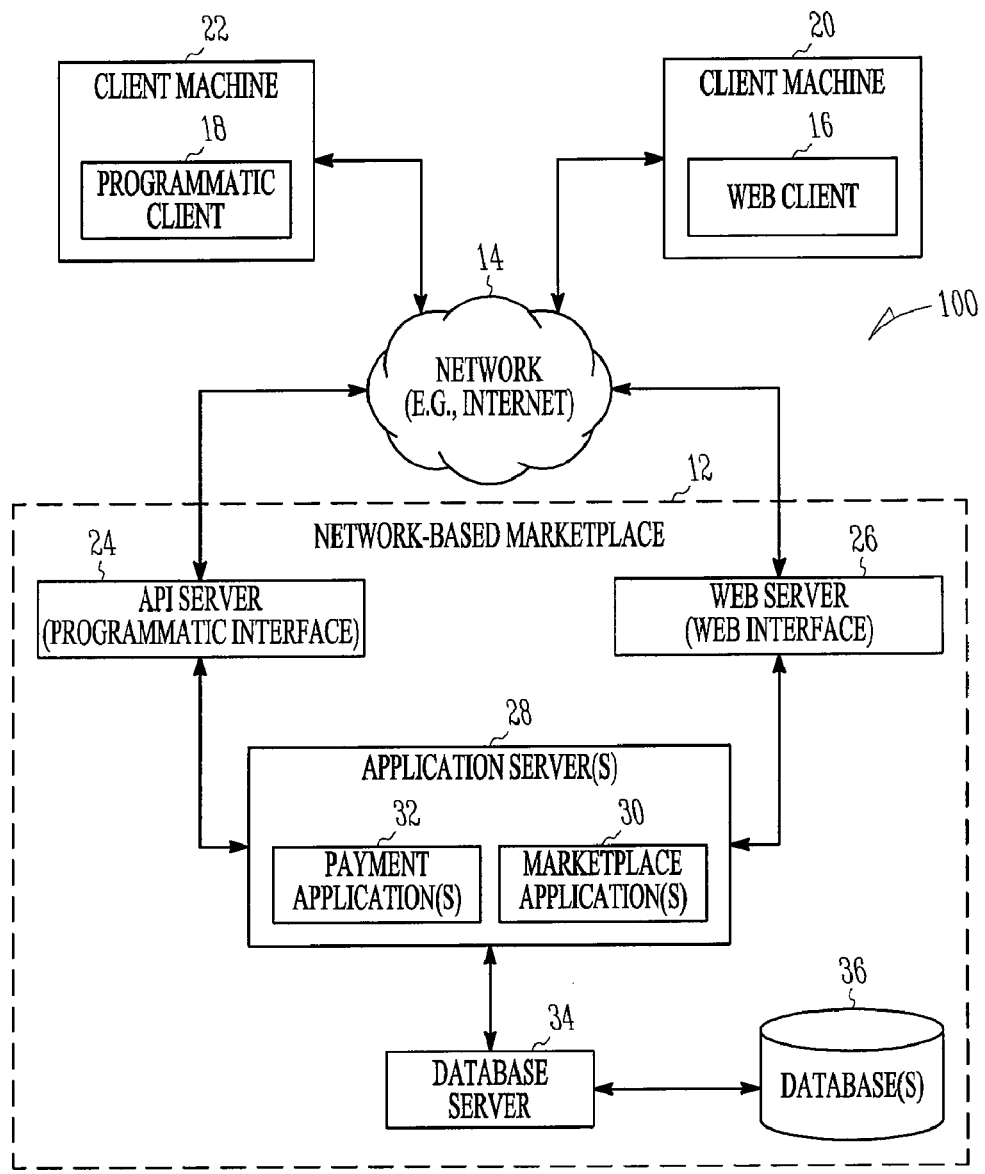
FIG. 1 is a detailed network diagram illustrating a system having a client-server architecture, in accordance with one example embodiment.

FIG. 1 is a network diagram illustrating a system 100 having a client-server architecture, in accordance with one example embodiment. A server platform, in the example form of commerce system 12, provides server-side functionality, via a network 14 (e.g., the Internet) to one or more clients. Referring to FIG. 1, for example, a web client 16 (e.g., a browser, such as the Internet Explorer browser developed by Microsoft Corporation of Redmond, Wash. State), and a programmatic client 18 execute on respective client machines 20 and 22.

Turning specifically to the network-based commerce system 12, an Application Program Interface (API) server 24 and a web server 26 are coupled to, and provide programmatic and web interfaces respectively to, one or more application servers 28. The application servers 28 host one or more applications, e.g., marketplace (commerce system) applications 30 and payment applications 32. The application servers 28 are, in turn, shown to be coupled to one or more databases servers 34 that facilitate access to one or more databases 36.

The marketplace applications 30 provide a number of commerce system functions and services to users that access the commerce system 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based commerce system 12, it will be appreciated that, in alternative embodiments of the present invention, the payment applications 32 may form part of a payment service that is separate and distinct from the commerce system 12.

Further, while the system 100 shown in FIG. 1 employs a client-server architecture, embodiments of the present invention are of course not limited to such an architecture, and could equally well find application in a distributed or a peer-to-peer architecture system. The various marketplace and payment applications 30 and 32 could also be implemented as standalone software programs, which do not necessarily have networking capabilities.

The web client 16 may access the various marketplace and payment applications 30 and 32 via the web interface supported by the web server 26. The web client 16 may, for example, be a buyer application. Similarly, the programmatic client 18 may access the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an on-line manner, and to perform batch-mode communications between the programmatic client 18 and the network-based commerce system 12. Example embodiments may be deployed either within an interface presented by the web client 16, or the programmatic client 18.

The system 100 shown in FIG. 1 may bring users searching for the same topic to a web-based live chat room to allow them to exchange information. For example, the system 100 may allow sellers to approach potential buyers to promote or sell their goods or services. The system 100 may also allow buyers of the same interest to exchange their ideas on their searches.

While the system 100 shown in FIG. 1 employs only one web client 16 and one programmatic client 18, it will be appreciated that the number of web clients 16 or programmatic clients 18 is not limited to one. For example, multiple buyers may respectively use multiple web clients 16 to buy goods or services, and multiple sellers may respectively use multiple programmatic clients 18 to sell goods or services.

Figure 2:
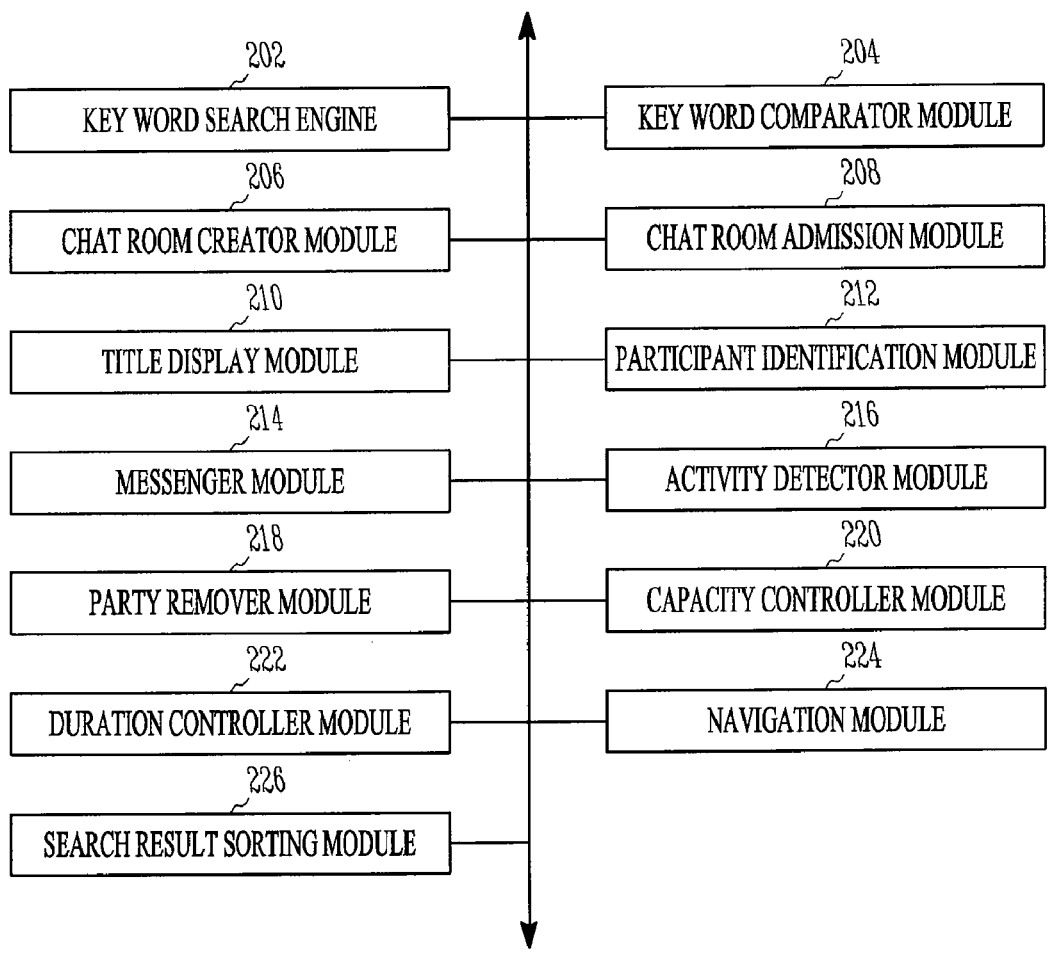
FIG. 2 is a block diagram illustrating multiple marketplace applications, in accordance with one example embodiment.

FIG. 2 is a block diagram illustrating multiple marketplace applications 30 that, in one example embodiment, are provided as part of the network-based commerce system 12. The marketplace system 12 may provide a chat room mechanism, and a number of listing and price-setting mechanisms, whereby sellers may promote or sell their goods or services, buyers may express their interests or desires to purchase such goods or services, and prices can be set for transactions pertaining to the goods or services.

The marketplace applications 30 may include, but are not limited to, a key word search engine 202, a key word comparator module 204, a chat room creator module 206, a chat room admission module 208, a title display module 210, a participant identification module 212, a messenger module 214, an activity detector module 216, a party remover module 218, a capacity controller module 220, a duration controller module 222, a navigation module 224, and a search result sorting module 226.

Figure 3:
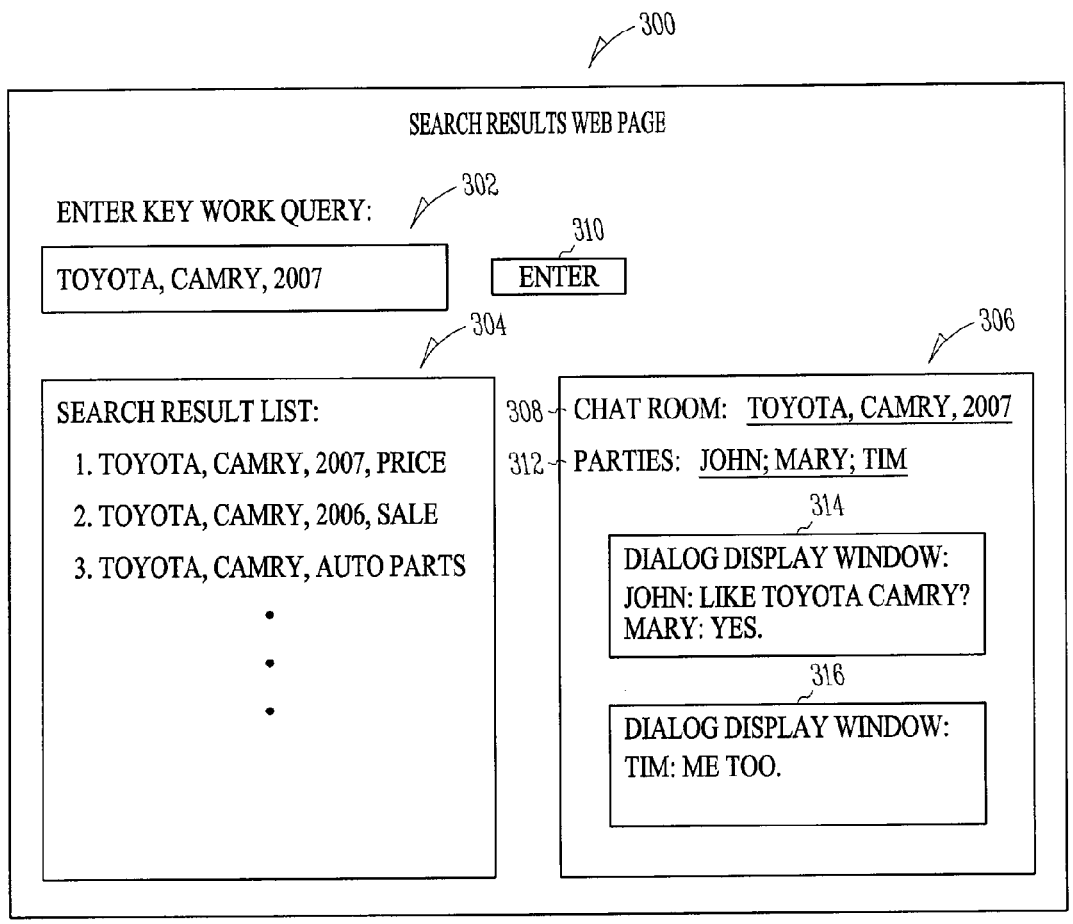
FIG. 3 is a user interface diagram illustrating a search result web page embedded with a chat room, according to example embodiment.

The key word search engine module 202 may be used by a user to conduct a key word search over a network 14. The user may enter a query containing one or more key word or phrase (e.g., "Toyota", "Camry", and "2007"). The key word search engine module 202 therefore may create a search result web page (as shown in FIG. 3) based on the key word search query.

The key word comparator module 204 may be used to compare between the just entered key word search query from a party and the existing key word query previously entered from other parties. For example, the key word comparator module 204 can be used to retrieve a list of key word search queries with substantial similarity. Here, "substantial similarity" denotes that two key word search queries are the same, or even though not the same, but close. For example, a query using key words "Toyota", "Camry", and "2007" is considered to have substantial similarity with another query using key words "Toyota", "Camry", and "2006". In another example, a query using key words "eBay", "back to school", and "shopping" is considered to have substantial similarity with another query using key words "EBAY", "back-to-school", and "sales".

The chat room creator module 206 may be used to generate a chat room, which can be embedded into a search result web page. In an example embodiment, when no existing query is found having substantial similarity with the just entered key word search query, the chat room generator module 206 may generate a new chat room, and then may embed the chat room into a search result web page. As a result, the user may wait in the new generated chat room for a future user who would enter a query having substantial similarity with the query just entered from such user. In some example embodiments, by virtue of the chat room creator module 206, a seller may pay to create his own chat room to capture potential buyers using selected key words. The price of the selected keywords can be set by the marketplace service provider (e.g., eBay) based on market demand, or can be set dynamically by sellers through a bidding process. The duration of this chat room may depend on, for example, the fee paid by the seller.

The chat room admission module 208 may automatically admit a party into an existing chat room, if the query entered from the party is found to have substantial similarity with a query associated with the existing chat room. The existing chat room may therefore be embedded into a search result web page, which is generated based on the just entered key word search query.

The title display module 210 may display a title of the embedded chat room to a party who enters a key word search query. The title may be the key word search query just entered by the party, for example, "Toyota Camry 2007".

The party identification module 212 may identify each party or participant in the chat room. In one example embodiment, the party identification module 212 may identify each party in the chat room by their real names. In another example embodiment, the party identification module 210 may identify each party in the chat room by their nicknames.

The messenger module 214 may be used by the parties admitted to the chat room to exchange information over the network 14.

The activity detector module 216 may detect an activity conducted by any party in the chat room, who are, for example, seeking goods or services, offering to sale, asking questions, answering questions, expressing interests, or making comments. The party remover module 218 may remove a party or a participant from a chat room, e.g., based on the detection result made by the activity detector module 218. In an example embodiment, the party remover module 218 may remove a party who is detected to have been idle exceeding a predetermined period of time (e.g., 30 minutes).

The capacity controller module 220 may be used to limit the number of parties to be admitted into the chat room to a predetermined value (e.g., 10) in order to ensure the quality and efficiency of the communications among the participants. The duration controller module 222 may be used to set a life span of the chat room (e.g., 3 hours) and to remove the chat room from the search result web page after the chat room expiring its life span. In some example embodiments, a seller can stay in a public chat room by paying a fee. The duration of his stay, the approaching capacity of potential buyers, and the posting capacity may depend on the fee paid by the seller.

The navigation module 224 may be used to facilitate the navigation of the network based-marketplace system 12. For example, the navigation module 224 may enable key word searches of listings published via the marketplace system 12. The navigation module 224 may allows users to browse various category, catalogue, or inventory data structures within the marketplace system 12.

The search result sorting module 226 may be used to sort a list of search results. The search results may be, for example, sorted in a descending order according to the similarity between the search results and the key word entry just entered by a user.

FIG. 3 is a user interface diagram illustrating a search result web page 300 embedded with a chat room, according to an example embodiment. In the example embodiment, the search result web page 300 includes a key word query input region 302, a search result list region 304, and a chat room region 306.

The key word query input region 302 may be used to type a key word query, e.g., "Toyota", "Camry", and "2007". In an example embodiment, an "Enter" button 310 may be arranged near the key word query input region 302 to confirm and enter the typed key word query into the system.

The search result list region 304 may list the key word search results based on the key word query entered in the key word query input region 302. In some example embodiments, the search result list is listed in a descending order by the similarity between the search results and the key word query entered in the key word query input region 302.

The chat room region 306 may display a chat room associated with the key word search query entered by a party, enabling this party to exchange information with other parties who have entered key word search queries having substantial similarity with the key word search query entered by this party. The chat room 306 may display a chat room title 308 by using the key word search query, e.g., including "Toyota, Camry, 2007", which has been entered by such party in the key word query input region 302. The chat room 306 may list the parties admitted to the chat room by their names (e.g., John, Mary, Tim) or their nicknames. The chat room 306 may include for example two dialog windows: a dialog display window 314 and a dialog input window 316. The dialog display window 314 may be used to, for example, display the dialog between the parties in the chat room 306 in real time. The dialog input window 316 may be used to, for example, prompt and accept the typed input from the party using the client machine 20 or 22 as shown in FIG. 1.

In one example embodiment, the chat room 306 can show all the public contents from all the parties in the chat room. In another example embodiment, the chat room 306 only shows private conversations between two parties.

In some example embodiments, the chat room 306 may include a passing through window (not shown in FIG. 3), which is controlled by a passing through control module to display at least one name of at least one potential buyer moving from the left end toward the right end (or from the top end toward the bottom end) of the passing through window and disappearing at last. The virtual passing through window may simulate a real world scene, where a seller inside a shop may watch at least one potential buyer passing the shop window, and may invite the at least one buyer into the shop. Similarly, the seller in a chat room 306 may, for example, click a buyer name to invite the buyer into the chat room 306 for a private conversation before the buyer name passes to the end of the passing through window and disappears.

It is appreciated that the layout and form of the search result web page 300 is not limited to the one as shown in FIG. 3. For example, the chat room region 306 may be located under the search result list 304 or to the left of the search result list 304, instead of being located to the right of the search result list 304 as illustrated in FIG. 3. It is also appreciated that the form of dialog among the parties is not limited text dialog as shown in FIG. 3. For example, the parties may also communicate in the chat room in the form of audio, video, or combination of text, audio and video.

Figure 4:
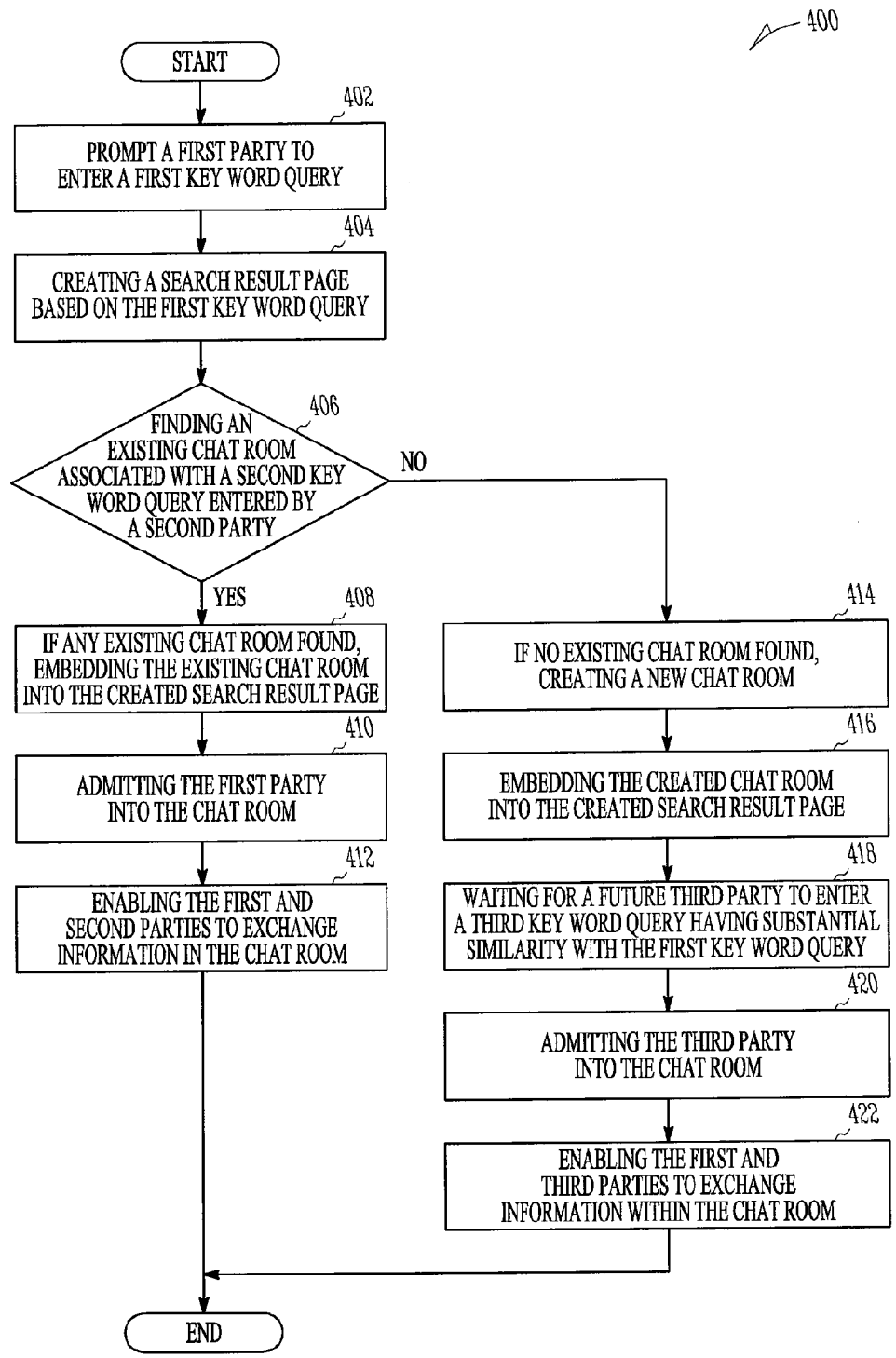
FIG. 4 is an example method diagram illustrating establishing live chat room communications over a network.

FIG. 4 is an example method diagram illustrating a method 400 of establishing live chat room communications over a network.

As shown in FIG. 4, at 402, a first party is prompted to enter a first key word search query, for example, "Toyota", "Camry", and "2007".

At 404, a search result web page is created based on the first key word search query. For example, a search result web page displays a list of search results.

At 406, a detection is conducted to find an existing chat room associated with a second key word search query entered by a second party, where the second key word search query should have substantial similarity with the first key word search query.

At 408, if the existing chat room is found at 406, the existing chat room is embedded into the created search result web page.

At 410, the first part is automatically admitted into the existing chat room.

At 412, the first and second parties are enabled to exchange information within the chat room over a network.

At 414, if no existing chat room found at 406, a new chat room is created in accordance with the first key word search query.

At 416, the created chat room is embedded into the created search result web page.

At 418, the first party waits, in the chat room, for a future third party who enters a third key word search query having substantial similarity with the first key word search query.

At 420, the third part, who has entered the third key word search query having substantial similarity with the first key word search query, is admitted into the chat room.

At 422, the first and third parties are enabled to exchange information within the chat room over the network.

In some example embodiments, the method 400 may detect any activity conducted by any party in the chat room. For example, if any party in the chat room is detected to have been idle for a predetermined period of time (e.g., 30 minutes), such party would be removed from the chat room.

In some example embodiments, the method 400 may control the capacity of the chat room within a predetermined number of participants, when the number of participants meeting the admission criteria exceeds a predetermined number (e.g., 15 people), to make sure that the participants in the chat room may conduct efficient communications.

Figure 5:
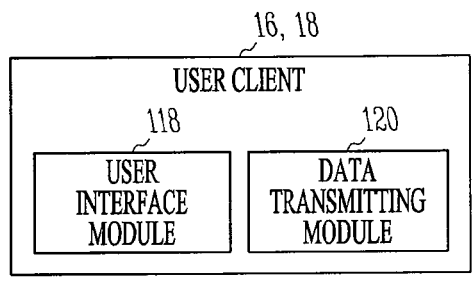
FIG. 5 is another network diagram illustrating a system for establishing chat room communications over a network, in accordance with an example embodiment.

FIG. 5 shows an example system to implement the above-mentioned method. The system as shown in FIG. 5 includes a user interface module 118 and a data transmitting module 120.

In an example embodiment, the user interface module 118 may be used to prompt a user via the graphical user interface to enter the information into the plurality of information fields and to receive via a user input device information input by the user for at least one of the information fields. The data transmitting module 120 may be used to commerce transmitting data over a network (e.g., the Internet) after the user has input information for at least one of the information fields before or while the user enters information into at least one other information field.

In some example embodiments, the system is implemented using a machine readable machine having instructions that, when executed by a machine, cause the machine to perform the method described herein.

Figure 6:
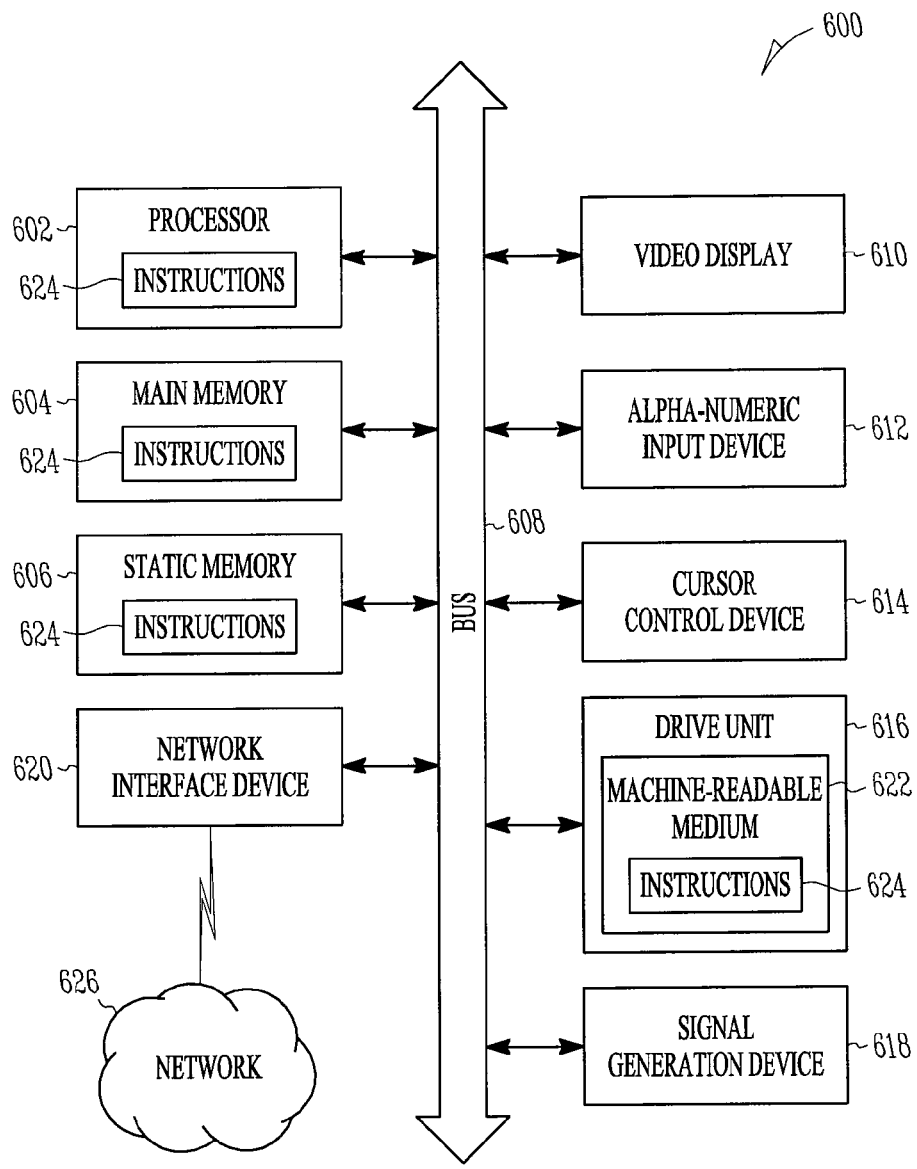
FIG. 6 is a diagram illustrating a machine in the example form of a computer system within which instructions, for causing the machine to perform any one or more of the methodologies discussed herein, may be executed.

FIG. 6 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

A disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media. The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although the present embodiments has been described with reference to specific example embodiments, it will be evident that various modifications and changes may be made to these embodiments without departing from the broader spirit and scope of the invention. For example, the various modules described herein may be preformed and created using hardware circuitry (e.g., CMOS based logic circuitry) as well as in software.

For example, the user interface module 118 and the data transmitting module 120 may be embodied using transistors, logic gates, and electrical circuits (e.g., application specific integrated ASIC circuitry). In addition, it will be appreciated that the various operations, processes, and methods disclosed herein may be embodied in a machine-readable medium and/or a machine accessible medium compatible with a data processing system (e.g., a computer system). Accordingly, the specification and drawings are to be regarded in an illustrative rather than a restrictive sense.

Further details are now provided regarding an example embodiment in which a listing creation user interface (e.g., an HTML page), to receive a plurality of listing information items, is generated by the commerce system 12 and communicated to a web client 16. The example embodiment seeks to improve page performance and reduce user wait time on picture upload functionality that enables a user to upload a picture for inclusion within a listing.

With the system and method of the application, users searching for the same topic may be brought into a web-based live chat room to allow them to exchange information, for example, to allow sellers to approach potential buyers of their goods or services, and to allow the buyers with same interests to exchange their ideas on some goods or services.

Although the present application has been described with reference to specific embodiments, it will be evident that various modifications and changes may be made to these embodiments without departing from the broader spirit and scope of the application. Accordingly, the specification and drawings are to be regarded in an illustrative rather than a restrictive sense.

The invention claimed is:

1. A system of exchanging information over a network, the system comprising:
    one or more processors;
    an interface module to prompt a query from a first party by a first key word search in the network and to prompt a query from a second party by a second key word search in the network;
    a key word comparator module executed by the one or more processors to compare the first and second key word searches and generate an output;
    a chat room admission module executed by the one or more processors to automatically admit the first and second parties into a chat room when the output of the key word comparator indicates substantial similarity between the first and second key word searches, the chat room embedded into a search result web page; and
    a chat room generator module executed by the one or more processors to generate a new chat room embedded into a search result web page, when the output of the key word comparator indicates no substantial similarity between the first and second key word searches.

2. The system of claim 1, further comprising a duration controller module to set a life span of the new chat room and to remove the new chat room after the end of the set life span.

3. The system of claim 1, further comprising a capacity controller module to limit the number of parties to be admitted into the chat room to a predetermined number.

4. The system of claim 1, further comprising a title display module to display a title of the embedded chat room to the first and second parties by using respectively the first and second key word searches.

5. The system of claim 1, further comprising a party identification module to identify each party admitted to the chat room.

6. The system of claim 1, further comprising:
    an activity detector module to detect an activity conducted by each party admitted to the chat room; and
    a party remover module to remove any party from the chat room in accordance with detection of an activity by the activity detector module.

7. The system of claim 6, wherein the party remover module is configured to remove a detected party from the chat room when the detected party has been idle for a predetermined period of time.

8. The system of claim 1, further comprising a messenger module to enable the first and second parties to exchange information data within the chat room.

9. The system of claim 1, further comprising a search result sorting module to sort search results listed in the search result web page in a descending order by the similarity between the search results and the entered key word search.

10. A system for generating a graphical user interface (GUI) of search result web page, the system comprising:

one or more processors;

a memory executed by the one or more processors and storing instructions to generate the GUI, the GUI comprising:

a first region displaying a key word search entered by a party;

a second region displaying a list of search results based on the key word search; and a third region displaying a chat room associated with the key word search query entered by the party, enabling the party to exchange information with at least another party who has entered another key word search having substantial similarity to the key word search entered by the party within the chat room, wherein a new chat room is displayed in the third region, when no substantial similarity exists between the key word search entered by the party and the another key word search entered by the at least another party.

11. The system of claim 10, wherein the chat room identifies a list of parties admitted to the chat room.

12. A method of exchanging information over a network, the method comprising:

prompting a first party to enter a first key word search;

creating a search result web page based on the first key word search;

finding an existing chat room associated with a second key word search entered by a second party over the network in accordance with the entered first key word search, the second key word search having substantial similarity with the first key word search;

embedding the chat room into the created search result web page;

admitting the first party into the chat room;

enabling first and second parties to exchange information within the chat room;

if no existing chat room is found, creating a new chat room in accordance with the first key word search entered by the first party; and admitting a future third party who enters a third key word search to the new created chat room, the third key word search having substantial similarity with the first key word search.

13. The method of claim 12, further comprising:

detecting activity conducted by each party in the chat room; and removing any party who has been detected to be idle for a predetermined period of time.

14. The method of claim 12, further comprising:

limiting capacity of the chat room to a predetermined number of parties.

15. A non-transitory machine-readable medium comprising instructions, which when implemented by one or more processors, perform the following operations:

prompting a first party to enter a first key word search;

creating a search result web page in accordance with the first key word search;

finding an existing chat room associated with a second key word search entered by a second party over the network based on the entered first key word search, the second key word search having substantial similarity with the first key word search;

embedding the chat room into the created search result web page;

admitting the first party to the chat room;

enabling first and second parties to exchange information within the chat room;

if no existing chat room is found, creating a new chat room in accordance with the first key word search entered by the first party; and admitting a future third party who enters a third key word search to the new created chat room, the third key word search having substantial similarity with the first key word search.

16. The non-transitory machine-readable medium of claim 15, further comprising instructions, which when implemented by one or more processors, perform the following operations:

detecting activity conducted by each party in the chat room; and removing any party who has been detected to be idle for a predetermined period of time.

17. The non-transitory machine-readable medium of claim 15, further comprising instructions, which when implemented by one or more processors, perform the following operations:

limiting capacity of the chat room to a predetermined number of parties.

* * * * *